UNITED STATES PATENT OFFICE.

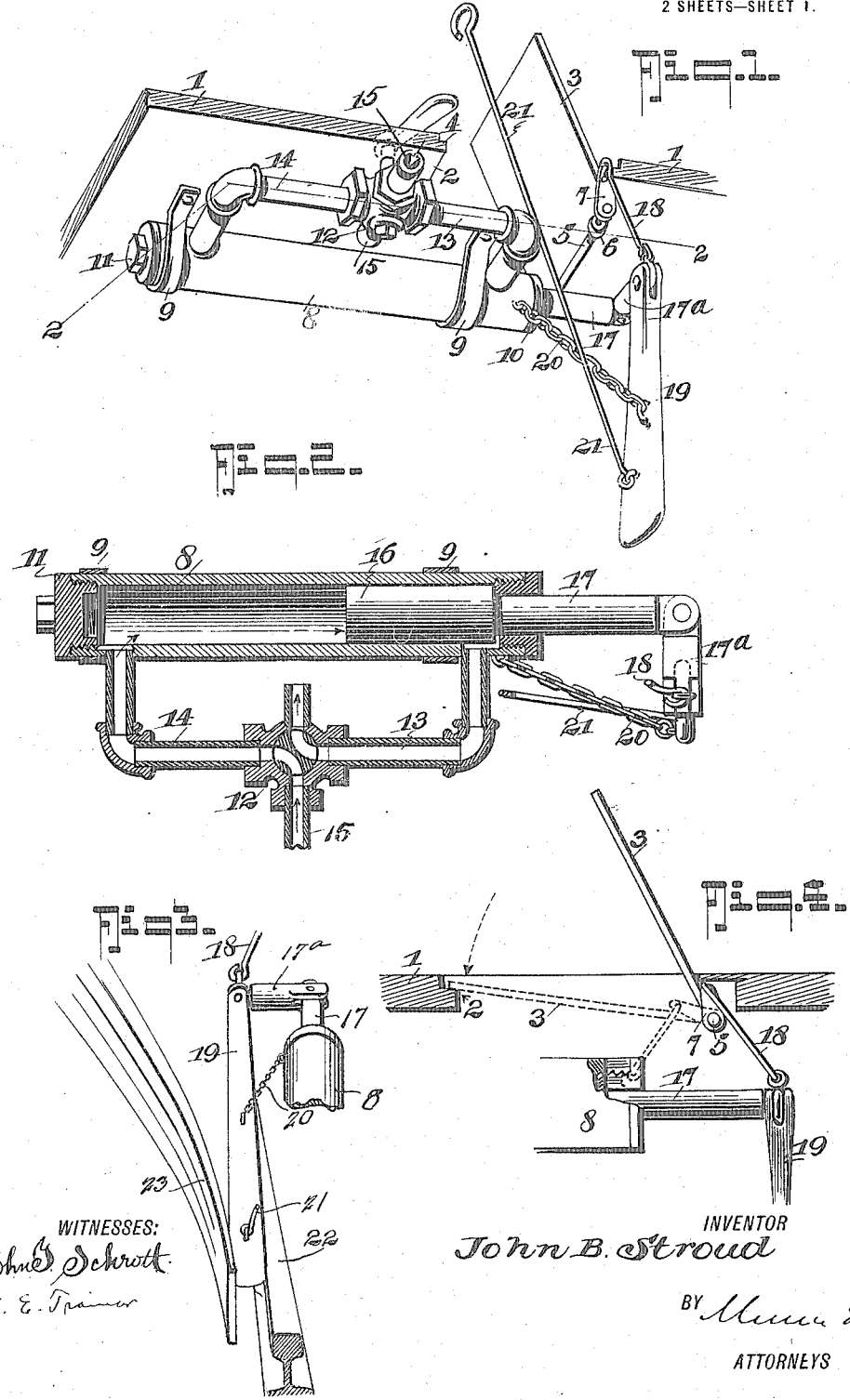
J. B. STROUD.
FLUID CONTROLLED SWITCH OPERATING MECHANISM.
APPLICATION FILED MAY 13, 1916.
1,270,987.
Patented July 2, 1918.
2 SHEETS—SHEET 1.
WITNESSES:
INVENTOR
John B. Stroud
BY
ATTORNEYS

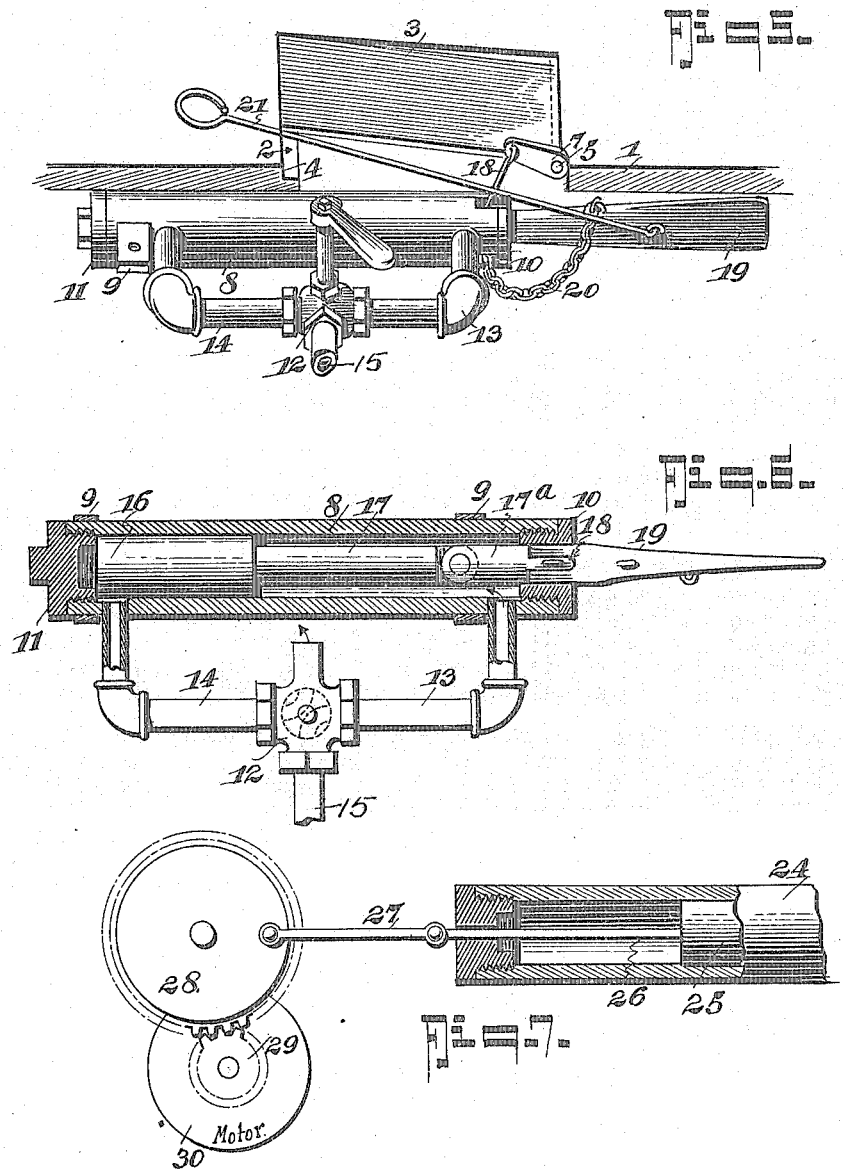

JOHN BELL STROUD, OF PASS CHRISTIAN, MISSISSIPPI.

FLUID-CONTROLLED SWITCH-OPERATING MECHANISM.

1,270,987.  Specification of Letters Patent.  Patented July 2, 1918.

Application filed May 13, 1916. Serial No. 97,281.

*To all whom it may concern:*

Be it known that I, JOHN B. STROUD, a citizen of the United States, and a resident of Pass Christian, in the county of Harrison and State of Mississippi, have invented a new and useful Improvement in Fluid-Controlled Switch-Operating Mechanisms, of which the following is a specification.

My invention is an improvement in fluid controlled switch operating mechanisms, and has for its object to provide mechanism of the character specified adapted for use on trolley cars and the like, wherein the fluid controlled operating mechanism is arranged below an opening in the floor of the car and connected to a door normally closing the opening in such manner that when the switch operating mechanism is in operative position the door will be open to permit the motorman or conductor to view the operation, and wherein the piston of the fluid control mechanism is so connected to the switch operating arm that when the piston is at one end of its travel the arm will be in operative position with the door open and when at the other end of its travel the arm will be in inoperative position and supported out of position to be injured by the movement of the car and with the door closed.

In the drawings:—

Figure 1 is a perspective view looking from below of the operating mechanism in place on the floor of a car and with the parts in operative position, Fig. 2 is a section on the line 2—2 of Fig. 1, Fig. 3 is a perspective view showing the manner of operating the switch.

Fig. 4 is a longitudinal vertical section through the door and the adjacent end of the cylinder showing the manner of controlling the door, Fig. 5 is a perspective view looking from above and with the parts in inoperative position.

Fig. 6 is a horizontal section with the parts in inoperative position, and

Fig. 7 is a side view partly in section of a pump for supplying fluid under pressure to the cylinders.

The present embodiment of the invention is shown in connection with the floor 1 of a car or the like, and the said floor has an opening 2, which is provided with a door 3, the door resting on shoulders 4, formed by rabbeting the floor at the opening. The door 3 is secured at one end to a shaft 5, which is journaled in bearings 6 on the car, and the shaft is provided at one end with a radial arm 7.

A cylinder 8 is connected with the floor of the car by means of hangers 9 near the opening and the ends of the cylinder are closed by heads 10 and 11, respectively, having threaded engagement with the cylinder. The cylinder has ports at its opposite ends and a four-way controlling valve 12 of ordinary construction is connected with the ports by means of pipes 13 and 14 and with a source of supply by means of a pipe 15 in such manner that the opposite ends of the cylinder will be alternately connected with the source of supply and the atmosphere.

The piston 16 has a sectional rod 17—17$^a$, the said rod consisting of a section 17 rigid with the piston, and a section 17$^a$ which is pivotally hinged to the section 17. This section 17$^a$ is pivoted to swing on a vertical axis, and a link 18 is connected at one end to the outer end of the section and at the other to the radial arm 7 in such manner that when the piston is at one end of the cylinder the section 17$^a$ will be held horizontally at right angles to the section 17 and with the door as shown in Figs. 1 and 4, while when the piston is at the opposite end of its travel the door will be closed as shown in Fig. 5 and the section 17$^a$ will aline with the section 17.

The switch operating arm indicated at 19 is pivoted to the outer end of the section 17$^a$ of the piston rod to depend therefrom as shown in Figs. 1, 3 and 4 when the piston is at one end of its travel, and a flexible member 20, as for instance, a chain, is arranged between the arm 19 intermediate the ends thereof and the adjacent end of the cylinder, the chain holding the arm in vertical position and against swinging movement away from the cylinder when the parts are in the position of Fig. 1.

A rod 21 is pivoted to the arm 19 near its lower end and the upper end of the rod is provided with a ring as shown for convenience in manipulating the same. This rod extends through the opening 2 and the operating mechanism for the valve 12 extends above the floor of the car as shown in Fig. 1. The piston, piston rod and cylinder are arranged relatively, such that when the piston is at the end of the cylinder remote from the door, the piston rod will be entirely within the cylinder as will also the connected end of the arm 19, and the arm with its inner end in the opening of the head 10 will be held in the position shown in Figs. 5 and 6, that is, in inoperative position.

In use, the parts normally occupy the position shown in Figs. 5 and 6, with the door 3 closed. When the motorman wishes to operate a switch, he will move the valve into the position of Fig. 2, and the fluid under pressure will force the piston outwardly. As the joint between the switch arm 19 and the section 17ª of the rod moves out of the piston, the arm 19 will drop down into a vertical position, with its wide dimension parallel with the axis of the cylinder. By means of the link 21 the edge of the blade is now guided between the switch rail and the main line rail. As the piston moves on, the link 18 will cause the section 17ª of the rod to take the position shown in Figs. 1 and 2, and the switch arm will be given a quarter turn, that it, with its wide dimension perpendicular to the rail, and the switch rail will be moved away from the main line rail. The chain 20 is for the purpose of preventing the lower end of the blade from swinging forwardly as the switch arm turns.

If desired, the operating mechanism may be arranged at the front of the car, far enough forward to be in sight of the motorman, so that he can operate the same without leaving his post.

The rod 21 normally extends above the floor of the car, passing through the door opening between the edge of the door and the door opening.

In Fig. 7 is shown a pump for supplying fluid under pressure to the cylinder 8. In this construction a cylinder 24 is provided, in which moves a piston or plunger 25, and the said plunger is operated from the motor 30 through a gearing consisting of a pinion 29 on the motor shaft and the gear wheel meshing therewith. The gear wheel 28 is connected to the piston by means of the piston rod 26 and a link 27.

I claim:—

1. A fluid controlled switch operating mechanism for use with cars, and comprising a cylinder adapted to be arranged adjacent to an opening in the floor of the car, a piston therein, means for controlling the flow of fluid to and from the respective ends of the cylinder, a shaft journaled transversely of the cylinder near one end thereof, and provided with a radial arm, and having a door rigid with the shaft for closing the opening, a sectional rod connected with the piston and comprising a section rigid with the piston and a section pivoted to the first-named rod, said rod extending through the end of the cylinder adjacent to the opening, a link pivotally connecting the outer end of the outer section of the rod to the radial arm of the shaft, and holding the said outer section in horizontal position and at right angles to the other section and with the door open when the piston is at the adjacent end of the cylinder, a switch operating arm depending from the outer section, a flexible connection between the arm intermediate its ends and the cylinder, and a guiding link connected to the arm and extending through the opening.

2. A fluid controlled operating mechanism for switches, comprising a cylinder, means for controlling the flow of the fluid to and from the respective ends of the cylinder, a switch operating arm, a sectional piston rod connecting the arm to the piston, one of the sections being rigid with the piston and the other pivoted to the first named section, and the arm being connected to the pivoted section, means for constraining the pivoted section of the rod to swing at right angles to the rod with the arm depending when the piston is at the adjacent end of the cylinder, and a flexible brace between the arm and the cylinder, and a guide link pivoted at one end to the arm and extending through the opening.

3. A fluid controlled operating mechanism for switches comprising a cylinder, means for controlling the flow of the fluid to and from the respective ends of the cylinder, a switch operating arm, a sectional piston rod connecting the arm to the piston, one of the sections being rigid with the piston and the other pivoted to the first named section, and the arm being connected to the pivoted sections, means for constraining the pivoted section of the rod to swing at right angles to the rod with the arm depending when the piston is at the adjacent end of the cylinder, and a flexible brace between the arm and the cylinder.

4. A fluid controlled operating mechanism for switches comprising a cylinder, means for controlling the flow of the fluid to and from the respective ends of the cylinder, a switch operating arm, a sectional piston rod connecting the arm to the piston, one of the sections being rigid with the piston and the other pivoted to the first named section, and the arm being connected to the pivoted section, and means for constraining the pivoted section of the rod to swing at right angles to the rod with the arm depending when the piston is at the adjacent end of the cylinder.

5. An operating means for switches comprising a cylinder having a plunger, a switch operating arm, a sectional plunger, one of the sections being rigid with the plunger, and the other pivoted to the first named section, the arm being pivoted to the last named section, means for holding the pivoted section at right angles to the other section, and extending horizontally therefrom when the plunger is at the adjacent end of the cylinder, means for turning the arm to move the switch points, and means for moving the plunger.

JNO. BELL STROUD.

Witnesses:
REBELLIA A. BRANDT STROUD,
ANNA M. BRANDT.

Copies of this patent may be obtained for five cents each, by addressing the "Commissioner of Patents, Washington, D. C."